United States Patent
Baek et al.

(10) Patent No.: US 8,316,077 B2
(45) Date of Patent: Nov. 20, 2012

(54) APPARATUS AND METHOD FOR PARALLEL-PROCESSING DATA FLOW

(75) Inventors: Dong Myoung Baek, Daejeon (KR); Bhum Cheol Lee, Daejeon (KR); Jung Hee Lee, Daejeon (KR); Sang Yoon Oh, Daejeon (KR); Seung-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 203 days.

(21) Appl. No.: 12/912,134

(22) Filed: Oct. 26, 2010

(65) Prior Publication Data

US 2011/0153710 A1      Jun. 23, 2011

(30) Foreign Application Priority Data

Dec. 21, 2009   (KR) .................. 10-2009-0128201

(51) Int. Cl.
   *G06F 15/16*      (2006.01)
(52) U.S. Cl. ....................... 709/201; 709/215
(58) Field of Classification Search .......... 709/200–202, 709/215
   See application file for complete search history.

(56) References Cited

U.S. PATENT DOCUMENTS

| | | | |
|---|---|---|---|
| 6,711,179 B1* | 3/2004 | Hanaoka et al. | 370/474 |
| 6,854,117 B1 | 2/2005 | Roberts | |
| 6,987,985 B2* | 1/2006 | Purkayastha et al. | 455/552.1 |
| 7,204,746 B2* | 4/2007 | Purkayastha et al. | 455/552.1 |
| 2004/0248615 A1* | 12/2004 | Purkayastha et al. | 455/552.1 |
| 2008/0077705 A1 | 3/2008 | Li et al. | |

FOREIGN PATENT DOCUMENTS

| | | |
|---|---|---|
| EP | 1868333 A1 | 12/2007 |
| KR | 10-0462480 | 12/2004 |

* cited by examiner

*Primary Examiner* — Moustafa M Meky
(74) *Attorney, Agent, or Firm* — Nelson Mullins Riley & Scarborough LLP; EuiHoon Lee, Esq.

(57) ABSTRACT

Provided is a data flow-parallel processing apparatus and method. The data flow-parallel processing apparatus may include a lower layer processing unit to identify a flow of inputted first data, a distribution unit to select, from among a plurality of upper layer processing units, an upper layer processing unit corresponding to the flow, and to transmit the first data to the selected upper layer processing unit, and an upper layer processing unit to process an upper layer packet of the first data, based on a local memory corresponding to the flow from among a plurality of local memories.

18 Claims, 2 Drawing Sheets

APPARATUS AND METHOD FOR PARALLEL-PROCESSING DATA FLOW

CROSS-REFERENCE TO RELATED APPLICATION

This application claims the benefit of Korean Patent Application No. 10-2009-0128201, filed on Dec. 21, 2009, in the Korean Intellectual Property Office, the disclosure of which is incorporated herein by reference.

BACKGROUND

1. Field of the Invention

The present invention relates to a data flow parallel-processing apparatus and method, and more particularly, to a data flow parallel-processing apparatus and method that may effectively process data using a memory storing process information associated with data of each flow.

2. Description of the Related Art

An OSI 7 layer model is generally used for layering of a protocol. An Internet protocol stack may be constituted of five layers including layer 1 through layer 4 and layer 7. Layer 2 through layer 4 may be layers determined based on a transport scheme. Layer 2 may be an Ethernet protocol, and layer 3 and layer 4 may include Internet protocols.

Layer 2 through layer 4 may process a frame or a packet based on a dedicated hardware or a network processor, and a main issue of layer 2 through layer 4 is a process performance. Layer 7 may be an application layer including information associated with various services, and a main issue of layer 7 is flexibility.

As a multi-core processor combining and merging the various transport schemes is developed, a development of a processing ability and a high efficiency may be desired. Therefore, there is a desire for an effective processing in layer 2 through layer 7.

SUMMARY

An aspect of the present invention provides a data flow parallel-processing apparatus and method that may process an upper layer packet of inputted data, through an upper layer processing unit corresponding to a flow of the data, based on a local memory corresponding to the flow and thus, may effectively process the data.

Another aspect of the present invention also provides a data flow parallel-processing apparatus and method that may parallel-process data using a plurality of upper layer processing units and thus, may process the data at high-speed.

According to an aspect of the present invention, there is provided a data flow parallel-processing apparatus including a lower layer processing unit to identify a flow of inputted first data, a distribution unit to select, from among a plurality of upper layer processing units, an upper layer processing unit corresponding to the flow, and to transmit the first data to the selected upper layer processing unit, and an upper layer processing unit to process an upper layer packet of the first data, based on a local memory corresponding to the flow from among a plurality of local memories.

According to an aspect of the present invention, there is provided a data flow parallel-processing method including identifying a flow of inputted first data, selecting, from among a plurality of upper layer processing units, an upper layer processing unit corresponding to the flow, transmitting the first data to the selected upper layer processing unit, and processing an upper layer packet of the first data, based on a local memory corresponding to the flow from among a plurality of local memories.

Additional aspects, features, and/or advantages of the invention will be set forth in part in the description which follows and, in part, will be apparent from the description, or may be learned by practice of the invention.

EFFECT

According to embodiments, an upper layer packet of inputted data may be processed by an upper layer processing unit corresponding to a flow of the data, based on a local memory corresponding to the flow and thus, the data may be effectively processed.

According to embodiments, data may be parallel-processed using a plurality of upper layer processing units and thus, the data may be processed at high-speed.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
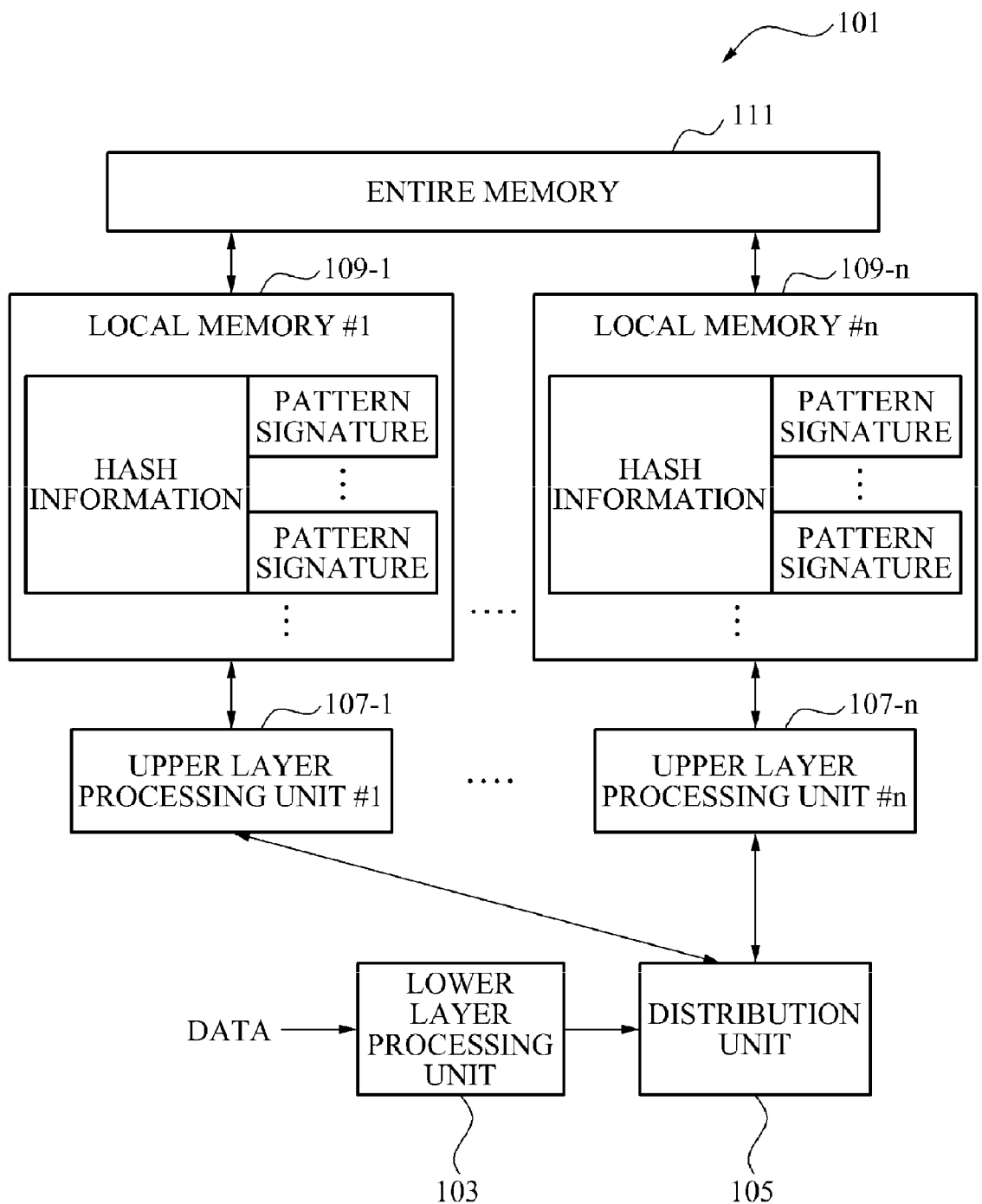
FIG. 1 is a diagram illustrating a configuration of a data flow parallel-processing apparatus according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a configuration of a data flow parallel-processing apparatus 101 according to an embodiment of the present invention.

Referring to FIG. 1, the data flow-parallel processing apparatus 101 according to an embodiment of the present invention may include a lower layer processing unit 103, a distribution unit 105, a plurality of upper layer processing units 107-1 through 107-n, a plurality of local memories 109-1 through 109-n, and an entire memory 111.

The lower layer processing unit 103 may identify a flow of inputted first data. The lower layer processing unit 130 may identify the flow using a lower layer packet of the first data, and may generate a flow identification (FID) with respect to the identified flow. For example, the lower layer processing unit 103 may identify the flow based on layer 2 through layer 4 packets from among multiple packets of an Open Systems Interconnection (OSI) model layer 7, and the lower layer packet may not be limited thereto.

The distribution 105 may select an upper layer processing unit corresponding to the flow from among the plurality of upper layer processing units 107-1 through 107-n, and may transmit the first data and the flow to the selected upper layer processing unit.

In this case, when a number of identified flows is greater than or equal to a number of upper layer processing units, and a flow of inputted second data is the same as the flow of the first data, the distribution unit 105 may transmit the second data and the flow to the upper layer processing unit where the first data and the flow are transmitted. Therefore, when FIDs of flows of data are the same, the distribution unit 105 may transmit the corresponding data and the corresponding flows to the same upper layer processing unit.

The distribution unit 105 may set, as an activated flow, a flow received periodically at predetermined intervals. When the flow of the first data is the activated flow, the distribution unit 105 may transmit the first data and the flow to an upper layer processing unit corresponding to the flow based on predetermined regulations. The distribution unit 105 may set, as an inactive flow, a flow that is not periodically received. When the flow of the first data is the inactivated flow, the distribution unit 105 may transmit the first data and the flow to an upper layer processing unit being in an idle state where the upper layer processing unit does not operate.

Conversely, when the number of identified flows is less than the number of upper layer processing units, and the flow of the inputted second data is the same as the flow of the first data, the distribution unit 105 may transmit the second data and the flow to an upper layer processing unit that is different from the upper layer processing unit where the first data and the flow are transmitted, from among the plurality of upper layer processing units. Although FIDs of flows of data are the same, the distribution unit 105 may not transmit the corresponding data and the corresponding flows to the same upper layer processing unit to prevent data from being intensively transmitted to a single upper layer processing unit.

The plurality of upper layer processing units 107-1 through 107-n may exist. Each of the plurality of upper layer processing units 107-1 through 107-n may include a multi-core processor.

When one of the plurality of upper layer processing units 107-1 through 107-n is selected, by the distribution unit 105, to receive the first data, the selected upper layer processing unit may process an upper layer packet of the first data, based on a local memory corresponding to the flow of the first data from among the plurality of local memories 109-1 through 109-n. For example, the plurality of upper layer processing unit 107-1 through 107-n may process a layer 7 packet among multi-layer packets of the OSI model layer 7, based on process information.

The upper layer processing unit may obtain, from the local memory, the process information for processing the upper layer packet of the first data based on the lower layer packet of the first data. The upper layer processing unit may construct hash information from the lower layer packet of the first data, and obtain, from the local memory, the process information corresponding to the hash information.

The upper layer processing unit may obtain the process information for processing the upper layer packet, based on the local memory corresponding to the flow of the first data and thus, may minimize a retrieving time expended for retrieving the process information and may improve a rate of obtaining the process information, compared with retrieving of the process information based on the entire memory 111.

When the process information is not obtained from the local memory, the upper layer processing unit may obtain the process information from the entire memory 111 and may store the obtained process information in the local memory corresponding to the flow of the first data to update the process information.

The plurality of local memories 109-1 through 109-n may store process information for each hash information of a lower layer packet. In this case, the process information may be information associated with a pattern or a signature.

Each local memory may be constructed for each flow, and each local memory may correspond to one of the plurality of upper layer processing units 107-1 through 107-n. When each local memory receives a request for process information from a corresponding upper layer processing unit, each local memory may provide the requested process information for processing an upper layer packet to the corresponding upper layer processing unit.

The entire memory 111 may store process information for each hash information of a lower layer packet, with respect to all flows. The entire memory 111 may provide the process information for each hash information of the lower layer packet to a local memory corresponding to an upper layer processing unit, in response to the request for process information from the upper layer processing unit.

According to embodiments, an upper layer processing unit corresponding to a flow of inputted data may process, based on a local memory corresponding to the flow, an upper layer packet of the data and thus, may effectively process the data.

According to embodiments, data may be parallel-processed using the plurality of upper layer processing units 107-1 through 107-n and thus, may perform high-speed processing of the data.

Figure 2:
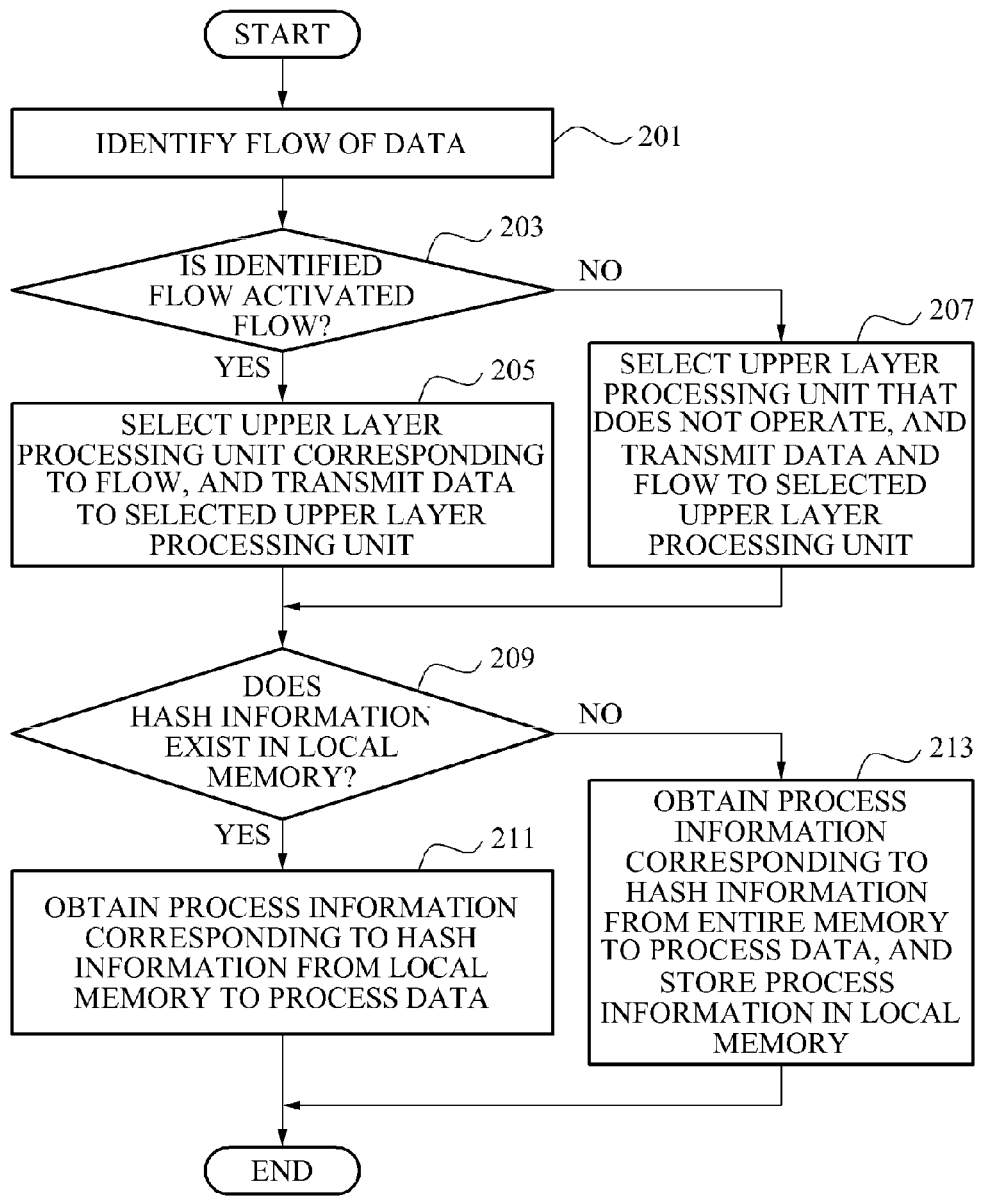
FIG. 2 is a flowchart illustrating a data flow parallel-processing method according to an embodiment of the present invention.

FIG. 2 illustrates a data flow parallel-processing method according to an embodiment of the present invention.

Referring to FIG. 2, a data flow parallel-processing apparatus may identify an inputted first data in operation 201.

The data flow parallel-processing apparatus may identify the flow based on a lower layer packet of the first data, and may generate an FID of the identified flow. For example, the data flow parallel-processing apparatus may identify the flow using layer 2 through layer 4 packets from among multi-packets of an OSI model layer 7, and the lower layer packet may not be limited thereto.

The data flow parallel-processing apparatus may determine a state with respect to the identified flow. The data flow parallel-processing apparatus may determine whether the identified flow is an activated flow or an inactivated flow, namely, a new flow, based on whether the data is received periodically at predetermined intervals in operation 203.

When the identified flow is the activated data that is received periodically at predetermined intervals, the data flow parallel-processing apparatus may select an upper layer processing unit corresponding to the flow from among the plurality of upper layer processing units based on a predetermined regulations, and may transmit the first data and the flow to the selected upper layer processing unit in operation 205.

When a flow of inputted second data is the same as the flow of the first data, the data flow parallel-processing apparatus may select the upper layer processing unit where the first data and the flow are transmitted, to transmit the second data and the flow to the selected upper layer processing unit. When FIDs of flows of data are the same, the data flow-parallel processing apparatus may transmit the corresponding data and the corresponding flows to the same upper layer processing unit.

When the identified flow is the inactivated flow that is not periodically received, the data flow parallel-processing apparatus may select, from among the plurality of upper layer processing units, an upper layer processing unit being in an idle state where the upper layer processing unit does not operate, and may transmit the first data and the flow to the selected upper layer processing unit in operation 207.

The data flow parallel-processing apparatus may determine, based on a local memory, whether hash information identical to hash information associated with a lower layer packet of the first data exists in operation 209.

The data flow parallel-processing apparatus may determine whether the hash information exists, based on the local memory corresponding to the flow of the first data from among the plurality of local memories.

Therefore, the data flow parallel-processing apparatus may obtain process information for processing the upper layer packet, based on the local memory corresponding to the flow of the first data and thus, may minimize a retrieving time expended for retrieving the process information and may improve a rate of obtaining the process information, compared with retrieving of the process information based on an entire memory.

When the hash information identical to the hash information constructed from the lower layer packet of the first data exists in the local memory, the data flow parallel-processing apparatus may obtain the process information corresponding to the hash information to process the upper layer packet of the first data in operation 211. The process information may be information for processing the upper layer packet of the first data.

For example, the data flow parallel-processing apparatus may process a layer 7 packet from among multi-layer packets of an OSI 7 model layer 7.

When the hash information identical to the hash information constructed from the lower layer packet of the first data does not exist in the local memory, the data flow parallel-processing apparatus may obtain the process information from the entire memory to process the upper layer packet of the first data in operation 213. The data flow parallel-processing apparatus may store the process information obtained from the entire memory in the local memory corresponding to the flow of the first data to update the process information.

In operation 205, when a number of identified flows is greater than or equal to a number of upper layer processing units, the data flow parallel processing apparatus may transmit the flows having the same FID and corresponding data to the same upper layer processing unit. However, when the number of identified flows is less than the number of upper layer processing units, the data flow parallel processing apparatus may transmit the flows having the same FID and corresponding data to different upper layer processing units and not transmit the flows having the same FID and corresponding data to the same upper layer processing unit and thus, may prevent data from being intensively transmitted to a single upper layer processing unit.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for parallel-processing data flow, the apparatus comprising:
    a lower layer processing unit to identify a flow of inputted first data;
    a distribution unit to select, from among a plurality of upper layer processing units, an upper layer processing unit corresponding to the flow, and to transmit the first data to the selected upper layer processing unit; and
    an upper layer processing unit to process an upper layer packet of the first data, based on a local memory corresponding to the flow from among a plurality of local memories.

2. The apparatus of claim 1, wherein the lower layer processing unit identifies the flow based on a lower layer packet of the first data.

3. The apparatus of claim 2, wherein the lower layer processing unit identifies the flow based on layer 2 through layer 4 packets from among multiple packets of an Open Systems interconnection (OSI) model layer 7.

4. The apparatus of claim 1, wherein, when a number of identified flows is greater than or equal to a number of upper layer processing units, and a flow of inputted second data is the same as the flow of the first data, the distribution unit transmits the second data to the selected upper layer processing unit.

5. The apparatus of claim 1, wherein, when a number of identified flows is less than a number of upper layer processing units, and a flow of an inputted second data is the same as the flow of the first data, the distribution unit selects, from among the plurality of upper layer processing units, another upper layer processing unit different from the selected upper layer processing unit.

6. The apparatus of claim 1, wherein the upper layer processing unit obtains, from the local memory, process information used for processing the upper layer packet of the first data based on a lower layer packet of the first data.

7. The apparatus of claim 6, wherein the upper layer processing unit constructs hash information from the lower layer packet of the first data, and obtains, from the local memory, the process information corresponding to the hash information.

8. The apparatus of claim 6, wherein the upper layer processing unit obtains, from an entire memory, the process information when the process information is not obtained from the local memory, and stores the obtained process information in the local memory.

9. The apparatus of claim 1, wherein the upper layer processing unit processes a layer 7 packet from among multiple packets of an OSI model layer 7.

10. A method for parallel-processing data flow, the method comprising:
    identifying a flow of inputted first data;
    selecting, from among a plurality of upper layer processing units, an upper layer processing unit corresponding to the flow;
    transmitting the first data to the selected upper layer processing unit; and processing an upper layer packet of the first data, based on a local memory corresponding to the flow from among a plurality of local memories.

11. The method of claim 10, wherein the identifying comprises:
    identifying the flow based on a lower layer packet of the first data.

12. The method of claim 11, wherein the identifying further comprises:
    identifying the flow based on layer 2 through layer 4 packets from among multiple packets of an OSI model layer 7.

13. The method of claim 10, wherein the selecting comprises:
    selecting the selected upper layer processing unit when a number of identified flows is greater than or equal to a number of upper layer processing units, and when the flow of inputted second data is the same as the flow of the first data.

14. The method of claim 10, wherein selecting comprises:
    selecting, from among the plurality of upper layer processing units, another upper layer processing unit different from the selected upper layer processing unit, when a number of identified flows is less than a number of upper layer processing units, and when a flow of an inputted second data is the same as the flow of the first data.

15. The method of claim 10, further comprising:
    obtaining, from the local memory, process information used for processing the upper layer packet of the first data, based on a lower layer packet of the first data.

16. The method of claim 15, wherein the obtaining comprises:
    constructing hash information from the lower layer packet of the first data, and obtaining, from the local memory, the process information corresponding to the hash information.

17. The method of claim 15, wherein the obtaining comprises:
    obtaining, from an entire memory, the process information when the process information is not obtained from the local memory, and storing the obtained process information in the local memory.

18. The method of claim 10, wherein the processing comprises:
    processing a layer 7 packet from among multiple packets of an OSI model layer 7.

* * * * *